Figure 1:
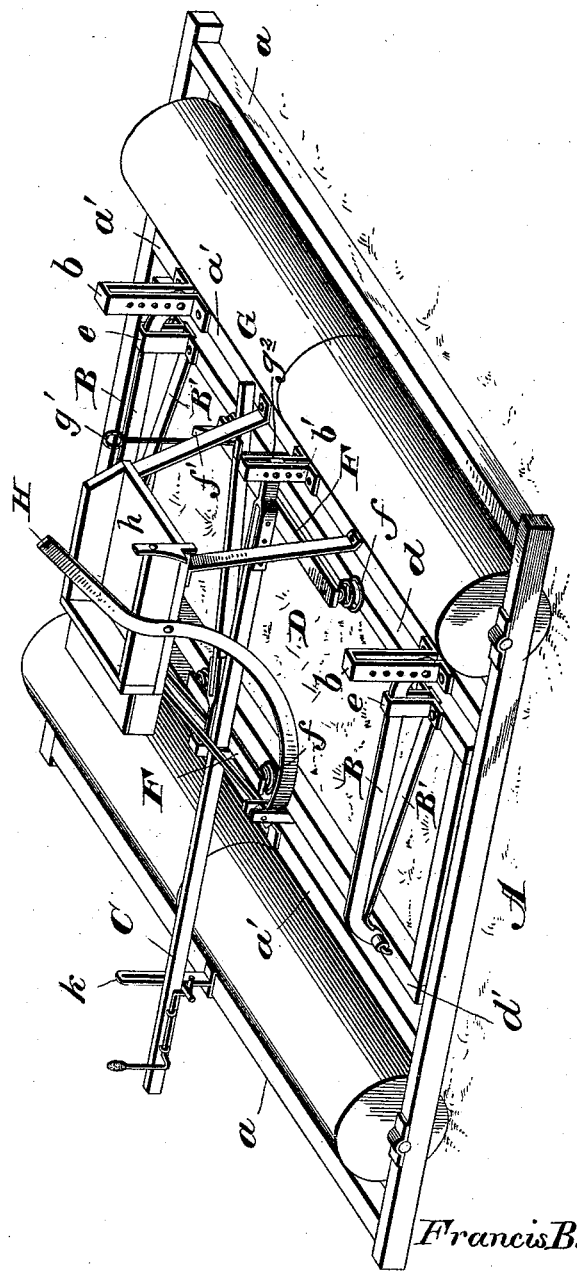

(No Model.)  2 Sheets—Sheet 1.

F. B. HARVEY.
HARROW AND ROLLER.

No. 461,334.  Patented Oct. 13, 1891.

Francis B. Harvey.
Inventor

Witnesses (No Model.) 2 Sheets—Sheet 2.
F. B. HARVEY.
HARROW AND ROLLER.
No. 461,334. Patented Oct. 13, 1891.
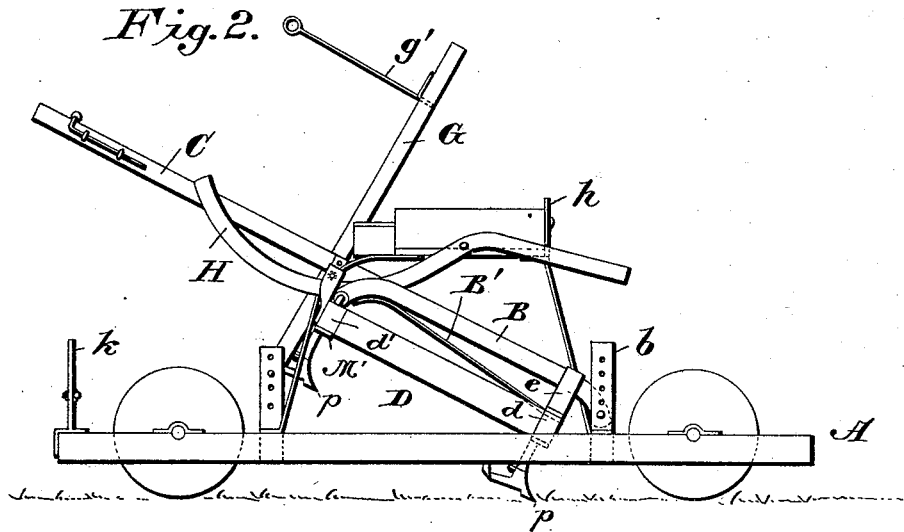
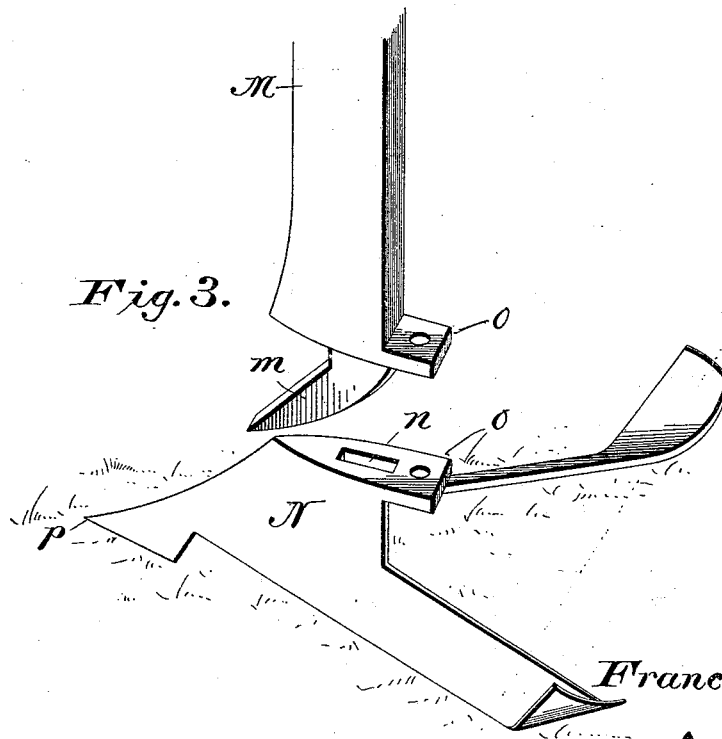
Witnesses
L. S. Elliott.
E. M. Johnson.
Francis B. Harvey.
Inventor
by
Attorney

UNITED STATES PATENT OFFICE.

FRANCIS B. HARVEY, OF PICKERING, PENNSYLVANIA.

HARROW AND ROLLER.

SPECIFICATION forming part of Letters Patent No. 461,334, dated October 13, 1891.

Application filed April 16, 1891. Serial No. 389,213. (No model.)

*To all whom it may concern:*

Be it known that I, FRANCIS B. HARVEY, a citizen of the United States of America, residing at Pickering, in the county of Chester and State of Pennsylvania, have invented certain new and useful Improvements in Harrows and Rollers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in combined harrows and land-rollers; and it consists in the construction and combination of the parts, as will be hereinafter fully set forth, and particularly pointed out in the claims.

In the accompanying drawings, forming part of this specification, Figure 1 is a perspective view of a roller and harrow constructed in accordance with my invention. Fig. 2 is a side view showing the harrow raised. Fig. 3 is a perspective view showing the construction of the harrow-tooth.

A refers to the main frame, which is provided with end cross-bars $a\ a$ and intermediate cross-bars $a'\ a'$, which are rigidly connected to each other, as shown. Between the transverse bars $a$ and $a'$ are journaled rollers of ordinary construction. The driver's seat is supported upon a suitable frame or legs, which are attached to and are carried by the transverse bars $a'$. The front transverse bar $a'$ is provided with uprights $b\ b$ and $b'$, which serve as means for connecting thereto bars B B, which are attached at their rear ends to the harrow-frame, and a depression-lever C, which extends rearwardly beyond the main frame A.

The harrow-frame D is made up of longitudinal cross-bars $d$ and $d'$, and to the front cross-bars $d$ are attached loops $e$, beneath which the bars B pass, the front ends of said bars engaging adjustably with the uprights $b$, while the rear ends are bent downwardly and are pivotally attached to the rear bar of the harrow-frame D. Springs B' are rigidly attached near the rear ends of the bars B, their ends pressing upon the front cross-bar $d$ of the harrow-frame beneath the loops $e$. By this construction I provide means for pivotally connecting the harrow-section D to the frame A, so that the rear ends can be elevated to raise the teeth from the ground. Centrally the harrow-section D has attached thereto four or more helical springs $f$, the upper ends of which pass through cross-bars F, the front cross-bar also carrying a guide or angle plate $f'$. These spring-bars F are adapted to contact with a lever C, which is adjustably pivoted to an upright $g^2$, carried adjacent to the center portion of the rear cross-bar $a'$ of the frame A, and this bar or lever when depressed will hold the harrow-frame down. The bar G is provided near its front end with a hand crank or catch $g'$, which engages when properly turned with an angle iron or plate carried by the front cross-bar $d$ of the harrow-section.

H refers to a curved lever, which is pivoted to the seat and passes through a U-shaped bail or loop attached to the rear bar $d'$ of the harrow-section, said bail or loop being provided with a roller, under which passes the curved end of the lever H, so that when the portion of the lever above its pivot is depressed the opposite end will be raised so as to elevate the harrow-section. To hold said harrow-section in an elevated position a gravity-catch $h$ is provided, which is pivoted to the seat and automatically engages with the upper end of the lever to hold the harrow-section raised. The construction of the lever shown provides a simple and effective means for raising the harrow-section.

When it is not desired to ride upon the harrow, I provide the structure with a depression-lever C, which is pivotally attached to the central upright $b'$ and passes over the bars F F, the rear end thereof being adapted to engage with an upright $k$, which is slotted and provided with a laterally-projecting adjustable arm, with which a bolt carried by the lever engages. This bar is attached to the harrow-section by a suitable loop.

In a device thus constructed it will be observed that the harrow-section will be held down by the weight of the rollers, but may have a slight upward spring movement by reason of the springs B' and f, and by means of the devices shown the harrow or cultivator teeth can be caused to enter the ground to the desired depth, and that the device can be used either as a riding or walking harrow.

In connection with the harrow-section hereinbefore described I prefer to use a tooth which is made up of two sections M and N, which are removably connected to each other, the upper portion M having a projecting lug $m$, which fits into a socket $n$ in the lower portion of the tooth, each part being provided at the rear with rearwardly-extending lugs having apertures which register with each other for the reception of a connecting-bolt. The lower portion of the tooth is made up of rearwardly-diverging members having upturned ends, these rearwardly-diverging members being inclined, as shown, in two directions— viz., from the front end rearwardly and also upwardly. The point $p$ has its lower edges horizontal and a shoulder is formed at the junction of the rearwardly-diverging members thereof. This tooth is adapted to enter the soil and loosen the same. The lower portion of the tooth is intended to be made of cast-steel while the upper portion is of malleable iron, this combination reducing the cost of manufacture. The upper portion or standard of the tooth has formed integral therewith a projecting member M', which is perforated for the reception of a bolt for pivotally or rigidly attaching the same to the harrow-section, the rearwardly-diverging members when in engagement with the soil keeping the teeth at all times in proper position.

I am aware that prior to my invention it has been proposed to make a cultivator-tooth of two parts and connect the parts together by bolts. I am also aware that it has been proposed to provide a combined roller and harrow with ordinary harrow-teeth, which are held positioned as to depth by adjusting-bars, and I do not claim such construction broadly as my invention.

I claim—

1. In a combined roller and harrow, the combination, with the frame A, carrying rollers, of a central harrow-section pivotally attached to the frame A by bars, which are also pivotally secured to the harrow-frame, springs carried by the connecting-bars, the free ends of said springs bearing upon the harrow-frame adjacent to the point of connection with the roller-frame, and a lever for elevating the harrow-section, substantially as set forth.

2. In combination with the frame A, a harrow-section pivotally attached thereto and provided with cross-bars which rest upon springs, a lever pivoted to the frame A and adapted to be held in engagement with the frame of the harrow-section, so as to bear upon the cross-bars so that said harrow-section may have a slight upward spring movement, substantially as set forth.

3. In combination with the roller-frame having cross-bars $a'$, a harrow-section D, having pivotally attached thereto bars B, said bars being adjustably secured to uprights $b'$, loops $e$, through which the bars B pass, and springs, as B', carried by the bars B and adapted to bear upon the front bar of the harrow-section adjacent to its pivotal point of connection with the frame A, substantially as shown, and for the purpose set forth.

4. In combination with a harrow-section D, bars B for pivotally attaching the same to a frame, a lever pivoted to the frame and adapted to engage with spring-bars carried by the harrow-section, and means for connecting the free end of the lever to the harrow-section, substantially as shown, and for the purpose set forth.

5. In combination with a harrow-section D, a frame A, carrying rollers, bars B B, pivoted at one end to the harrow-section and adjustably secured at its opposite end to the roller-supporting frame, loops $e$ $e$, carried by the harrow-section, through which the bars B B pass, springs B', attached to the harrow-section to hold the bars B B normally in engagement with the crossed portion of the loops $e$, a seat mounted on the roller-supporting frame and provided with a lever having a curved lower portion which is adapted to engage with a loop carried by the harrow-section, and a catch $h$ for engaging the handle portion of the lever H, substantially as set forth.

6. A tooth for cultivators or harrows made up of the parts M and N, removably connected to each other, the lower portion having a point $p$ and rearwardly-diverging members upwardly inclined from front to rear, the ends being upturned, an aperture $n$ in the lower member through which the projecting portion $m$, formed integral with the part M, passes, and means for connecting the parts to each other, substantially as set forth.

7. A tooth for harrows made up of the parts M and N, each having rearwardly-projecting portions $o$ $o$, correspondingly perforated for the reception of a single connecting-bolt, the upper portion of the tooth having a projecting portion $m$, adapted to fit within the socket forming the lower portion of the tooth, substantially as set forth.

In testimony whereof I have affixed my signature in presence of two witnesses.

FRANCIS B. HARVEY.

Witnesses:
DAVID HUTCHISON,
CHARLES BENNETT.